United States Patent
Nae et al.

(10) Patent No.: US 6,883,871 B2
(45) Date of Patent: Apr. 26, 2005

(54) ARMREST ADJUSTMENT MECHANISM AND METHOD OF ASSEMBLING SAME

(75) Inventors: Dan Dumitru Nae, Troy, MI (US); Wojciech Smuk, Troy, MI (US); Patrick Daniel, Bloomfield Hills, MI (US)

(73) Assignee: Faurecia Automotive Seating Canada Limited, Mississauga (CA)

( * ) Notice: Subject to any disclaimer, the term of this patent is extended or adjusted under 35 U.S.C. 154(b) by 0 days.

(21) Appl. No.: 10/665,622

(22) Filed: Sep. 22, 2003

(65) Prior Publication Data

US 2004/0124687 A1 Jul. 1, 2004

Related U.S. Application Data

(60) Provisional application No. 60/412,166, filed on Sep. 20, 2002.

(51) Int. Cl.$^7$ .................................................. B60N 2/46
(52) U.S. Cl. .............................. 297/411.32; 297/411.37; 403/52
(58) Field of Search ................................. 297/113, 115, 297/116, 411.32, 411.37, 411.38; 403/52, 164, 359.1, 359.3, 359.6, 298, 348, 350

(56) References Cited

U.S. PATENT DOCUMENTS

| | | | | |
|---|---|---|---|---|
| 2,646,107 A | * | 7/1953 | Murphy ....................... 297/113 |
| 4,159,145 A | * | 6/1979 | Quakenbush ................ 297/113 |
| 4,176,878 A | * | 12/1979 | Koutsky ....................... 297/115 |
| 4,400,033 A | * | 8/1983 | Pietsch ..................... 297/411.39 |
| 4,435,011 A | * | 3/1984 | Hakamata .................... 297/113 |
| 5,106,160 A | * | 4/1992 | Nomura et al. ......... 297/411.32 |
| 5,290,092 A | * | 3/1994 | Geer ....................... 297/411.32 |
| 5,409,297 A | * | 4/1995 | De Filippo .................. 403/93 |
| 5,709,432 A | * | 1/1998 | Gryp ........................ 297/411.32 |
| 6,471,297 B1 | * | 10/2002 | Runde et al. ........... 297/411.32 |

* cited by examiner

*Primary Examiner*—Peter R. Brown
(74) *Attorney, Agent, or Firm*—Patrick J. Hofbauer (57) ABSTRACT

An armrest adjustment mechanism for use with a vehicle seat defining a lateral seat axis and an armrest member defining a longitudinal axis. The mechanism includes a mounting system for pivotally mounting the armrest member on the vehicle seat for selective pivotal rotation about the lateral seat axis between a deployed design configuration, wherein the longitudinal axis has a substantially horizontal orientation, and a raised stowed configuration, wherein the longitudinal axis has a substantially vertical orientation. The mechanism also includes a lateral translation system for positive inward displacement of the armrest member along the lateral seat axis relative to the vehicle seat as the armrest member is rotated from the deployed design configuration towards the raised stowed configuration.

21 Claims, 11 Drawing Sheets

ARMREST ADJUSTMENT MECHANISM AND METHOD OF ASSEMBLING SAME

FIELD OF THE INVENTION

The present invention relates generally to an armrest adjustment mechanism, and more particularly, to an armrest adjustment mechanism for use with a vehicle seat having a folding armrest member.

BACKGROUND OF THE INVENTION

Modern vehicle seats, particularly those of the so-called "bucket seat" variety, typically have armrest members that are pivotally foldable upwardly from a generally horizontally oriented in-use design configuration to a generally vertically oriented stowed configuration. Such upward pivotal folding of the armrest members to the stowed configuration is useful in facilitating ingress and egress of a vehicle occupant from the vehicle seat itself, and to and from adjacent seats and/or rows of seats within a vehicle. Moreover, such upward pivotal folding of the armrest member facilitates subsequent forward folding of the backrest member of the seat over the seat cushion member to allow, for example, the backrest member to be forwardly folded to, for example, a substantially horizontally disposed load floor configuration, as is commonly desirable in sport utility vehicles and mini-vans, without interference of the armrest members with the seat cushion members or other components of the vehicle.

In this regard, and more generally in regard to vehicle seats intended for use in smaller, more compact vehicles, there is a need for an armrest adjustment mechanism that reduces the width of the backrest/armrest assembly when the armrest member is in its raised stowed configuration. This general need to reduce the width of vehicle seats having armrests in the stowed configuration must be balanced with the additional need to provide vehicle seats with armrests that are spaced laterally sufficiently far apart so as to be comfortable in the deployed design configuration.

Known vehicle seats having armrests provide only for the pivotal rotation of such armrest members about a lateral seat axis, without providing for significant lateral displacement of the armrest members therealong during such pivotal rotation. In view of this shortcoming in the prior art, and in order to provide a comfortably wide deployment of the armrest members in use whilst providing a compact stowed configuration, there exists a clear need for an armrest adjustment mechanism that provides for controlled rotation of the armrest member between the deployed design configuration and the raised stowed configuration, whilst concurrently providing for positive inward lateral displacement of the armrest member on rotation from the deployed design configuration towards the raised stowed configuration. Such mechanism must be simple and inexpensive to manufacture and to assemble on a vehicle seat.

SUMMARY OF THE INVENTION

In accordance with the present invention there is disclosed an armrest adjustment mechanism for use with a vehicle seat defining a lateral seat axis and an armrest member defining a longitudinal axis. The mechanism comprises a mounting means for pivotally mounting the armrest member on the vehicle seat for selective pivotal rotation about the lateral seat axis between a deployed design configuration, wherein the longitudinal axis has a substantially horizontal orientation, and a raised stowed configuration, wherein the longitudinal axis has a substantially vertical orientation. The mechanism also comprises a lateral translation means for positive inward displacement of the armrest member along the lateral seat axis relative to the vehicle seat as the armrest member is selectively rotated as aforesaid from the deployed design configuration towards the raised stowed configuration.

According to one aspect of a preferred embodiment of the invention, the mounting means comprises a male pivot pin pivotally engaging a complementary female pivot bearing for pivotal rotation of the pivot bearing about a pivot axis defined by the pivot pin. The pivot pin is rigidly mounted on the vehicle seat, with the pivot axis in substantially coaxial relation to the lateral seat axis. The pivot bearing is rigidly mounted on the armrest member.

According to another aspect of the preferred embodiment of the invention, the lateral translation means comprises a spiral screw-thread extending axially around the pivot pin so as to threadingly engage a complementary threaded segment formed on the pivot bearing. The inward displacement of the armrest member is progressively coincident with selective rotation of the armrest member about the lateral seat axis from the deployed design configuration towards the raised stowed configuration as aforesaid.

According to a further aspect of the preferred embodiment of the invention, the mechanism further comprises a stop means for preventing rotation of the armrest member beyond the deployed design configuration. The stop means is rigidly attached to the vehicle seat, and operatively engages the armrest member in the deployed design configuration.

In accordance with the present invention, there is disclosed an armrest adjustment mechanism for use with a vehicle seat defining a lateral seat axis and an armrest member defining a longitudinal axis. The mechanism includes a mounting means for pivotally mounting the armrest member on the vehicle seat for selective pivotal rotation about the lateral seat axis between a deployed design configuration where the longitudinal axis has a substantially horizontal orientation, and a raised stowed configuration where the longitudinal axis has a substantially vertical orientation. The mechanism also includes a lateral translation means for positive inward displacement of the armrest member along the lateral seat axis relative to the vehicle seat as the armrest member is selectively rotated as aforesaid from the deployed design configuration towards the raised stowed configuration. In accordance with this embodiment of the invention, the mechanism still further includes a stop means for preventing rotation of the armrest member beyond the deployed design configuration. The stop means is rigidly attached to the vehicle seat. The stop means operatively engages the armrest member in the deployed design configuration. The stop means includes a guide pin rigidly attached to the vehicle seat and adapted to operatively engage in abutting relation the armrest member in the deployed design configuration. The guide pin includes a fixed segment rigidly attached to the vehicle seat, and an extension segment operatively engaging in abutting relation the armrest member in the deployed design configuration. The extension segment securely engages the fixed segment in selectively removable relation, and its removal allows selective rotation of the armrest member beyond the deployed design configuration for subsequent removal of the pivot bearing with said armrest member from the pivot pin.

According to still another aspect of the preferred embodiment of the invention, the stop means is adapted for movement within an arcuate guide slot formed in the armrest member as the armrest member is selectively rotated as aforesaid from the deployed design configuration towards the raised stowed configuration. The arcuate guide slot has a first blind end and a second blind end. The extension segment operatively engages the first blind end in the deployed design configuration, and the fixed segment operatively engages the second blind end in the raised stowed configuration.

In accordance with the present invention there is also disclosed a method of assembling the mechanism. The method comprises the rigid mounting of a male pivot pin on a vehicle seat in substantially coaxial relation with a lateral seat axis. Likewise, a complementary female pivot bearing is rigidly mounted on an armrest member. Next, as a third step, a complementary threaded segment of the pivot bearing is wound on to a spiral screw-thread of the pivot pin in a first inward pivoting direction about the lateral seat axis from an initial assembly configuration of the armrest member, wherein the spiral screw thread of the pivot pin is initially aligned with the complementary threaded segment of the pivot bearing. Thereafter, the armrest member is pivotally rotated relative to the vehicle seat in the first inward pivoting direction beyond a deployed design configuration. In a last step, a stop means is rigidly mounted on the vehicle seat for preventing opposite rotation of the armrest member in a second outward pivoting direction beyond the deployed design configuration. The stop means is adapted to operatively engage the armrest member in the deployed design configuration.

According to another aspect of the preferred method of assembly, the method comprises a first additional step, before the third step, of rigidly mounting a fixed segment of the stop means on the vehicle seat. The fixed segment is adapted to permit rotation of the armrest member from the initial assembly configuration in the first inward pivoting direction beyond the deployed design configuration towards a raised stowed configuration. According to this aspect of the invention, in the last step of the method, an extension segment of the stop means is rigidly mounted on the fixed segment, preferably in selectively removable relation, with the extension segment operatively engaging in abutting relation the armrest member in the deployed design configuration.

According to a further aspect of the preferred method of assembly, the method comprises a further step, before the third step, of forming an arcuate guide slot in the armrest member. The arcuate guide slot is adapted to receive the extension segment in the deployed design configuration, and the fixed segment in the raised stowed configuration.

Other objectives, advantages, characteristics and features of the present invention, as well as methods of operation and functions of the related elements of the structure, and the combination of parts and economies of manufacture, will become more apparent upon consideration of the following drawings and detailed description, and the appended claims.

BRIEF DESCRIPTION OF THE DRAWINGS

The following drawings illustrate by way of example a presently preferred embodiment according to the invention. It is expressly understood, however, that the drawings are for the purpose of illustration and description only, and are not intended as a definition of the limits of the invention. In the accompanying drawings.

DETAILED DESCRIPTION OF A PREFERRED EMBODIMENTS

Referring now to FIGS. 1 through 8 of the drawings, an armrest adjustment mechanism 30 is shown in use with a vehicle seat 10 defining a lateral seat axis "A" and an armrest member 20 defining a longitudinal axis "B".

Figure 1:
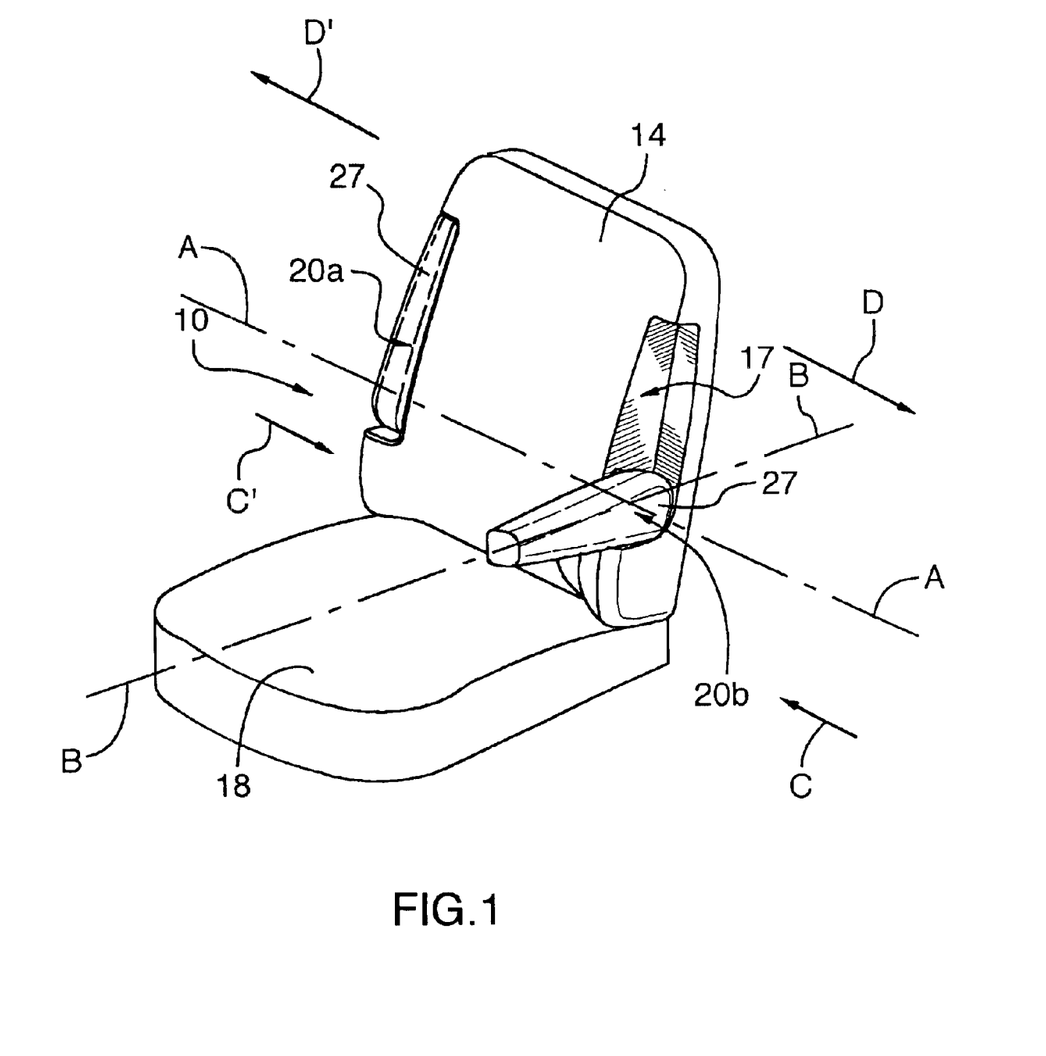
FIG. 1 is a top right perspective view of a vehicle seat with two armrest members, each having an armrest adjustment mechanism according to the invention.

With specific reference to FIG. 1, it will be appreciated that the vehicle seat 10 is of the general type having a backrest portion 14 and a seat cushion portion 18. Conventional upholstery materials are provided on each of the backrest portion 14 and the seat cushion portion 18 to support a user (not shown). The vehicle seat 10 shown in FIG. 1 has both an inboard-side armrest member 20a and an outboard-side armrest member 20b mounted thereon. While the armrest members 20a, 20b shown in FIG. 1 are attached to the backrest portion 14 of the vehicle seat 10, they might alternately be mounted on the seat cushion portion 18 thereof. Each of the armrest members 20a, 20b will be seen to include an armrest cushion portion 27, and the backrest portion 14 shown in FIG. 1 is provided with sculpted armrest recesses 17 that are each adapted to receive a respective one of the armrest members 20a, 20b when in a raised stowed configuration, wherein the longitudinal axis "B" has a substantially vertical orientation (best seen in FIGS. 3 through 5). In FIG. 1, the inboard-side armrest member 20a is shown in the raised stowed configuration as aforesaid, and the outboard-side armrest member 20b is shown in a deployed design configuration, wherein the longitudinal axis "B" has a substantially horizontal orientation. The deployed design configuration and the raised stowed configuration are discussed in further detail below. The armrest members 20a, 20b and their associated structures, including the armrest adjustment mechanism 30 of the present invention, are essentially identical, and for the sake of brevity, only the outboard-side armrest member 20b will be hereinafter described in detail.

Figure 2:
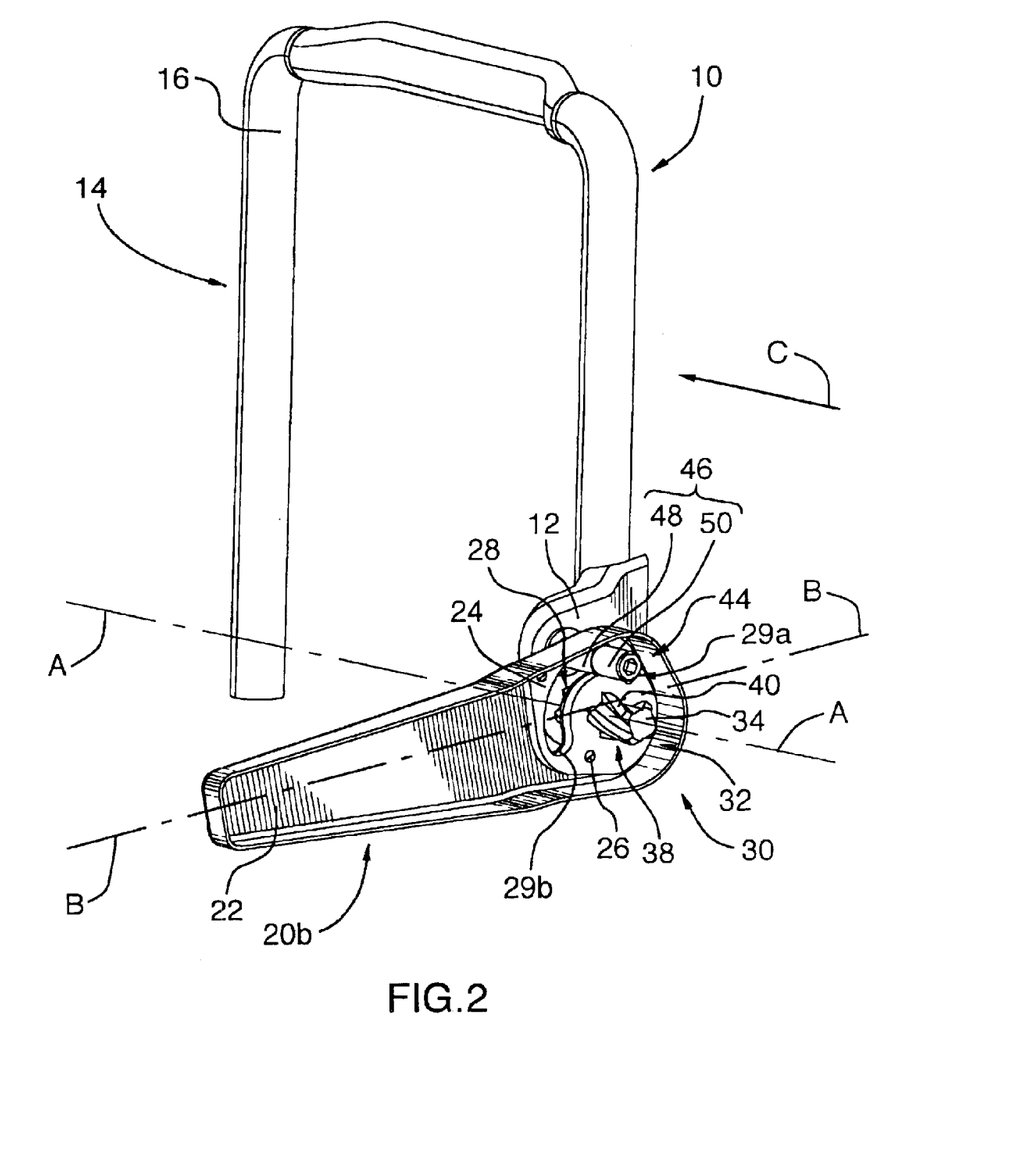
FIG. 2 is a top right perspective view of one of the armrest adjustment mechanisms of FIG. 1, shown in a deployed design configuration, with non-essential portions of the seat and armrest member removed for clarity of illustration.

It should first, however, be appreciated from FIG. 2, wherein the armrest cushion 27 and the cushioned area of the backrest portion 14 have been omitted for simplicity of presentation, that a back frame 16 is positioned within the backrest portion 14 of the vehicle seat 10, and that a pivot support plate 12 is rigidly mounted on the back frame 16. It will also be appreciated that a rigid armrest bracket 22 is positioned within the armrest cushion 27 of the armrest member 20b so as to act as a frame for the armrest member 20b.

Figure 3:
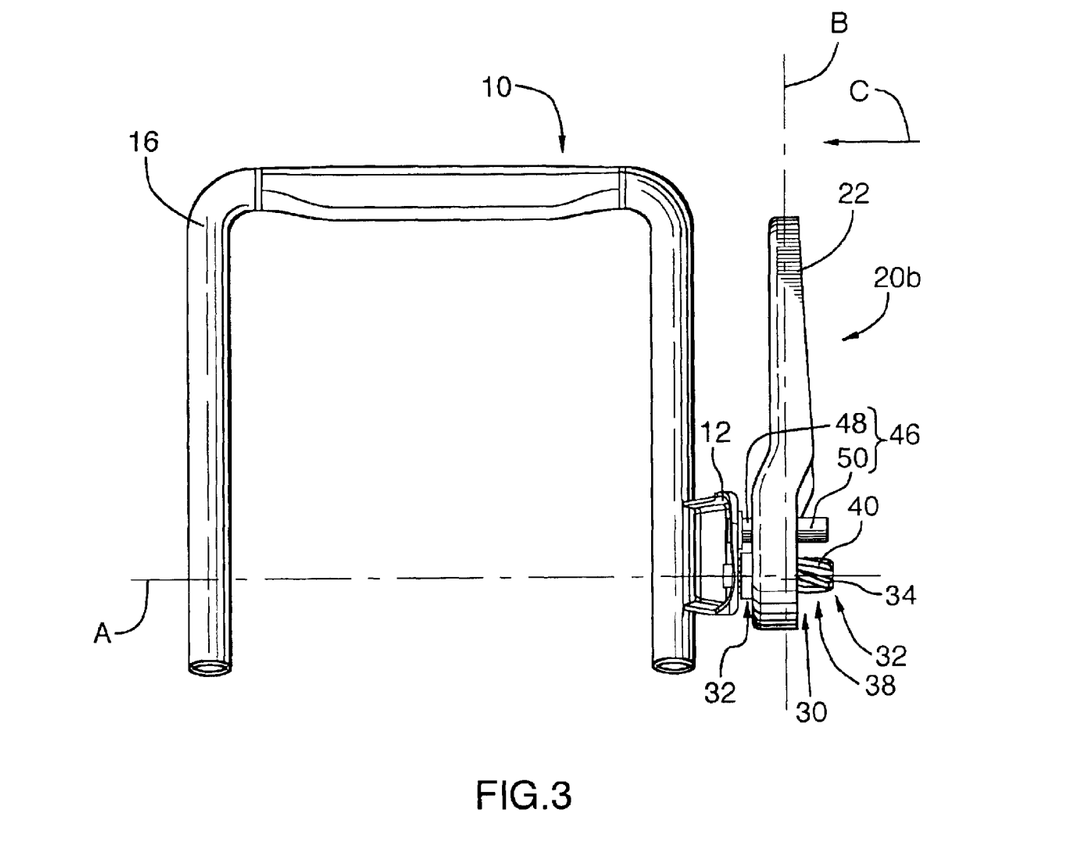
FIG. 3 is a front elevational view of the armrest adjustment mechanism of FIG. 2, shown in a raised stowed configuration.
Figure 4:
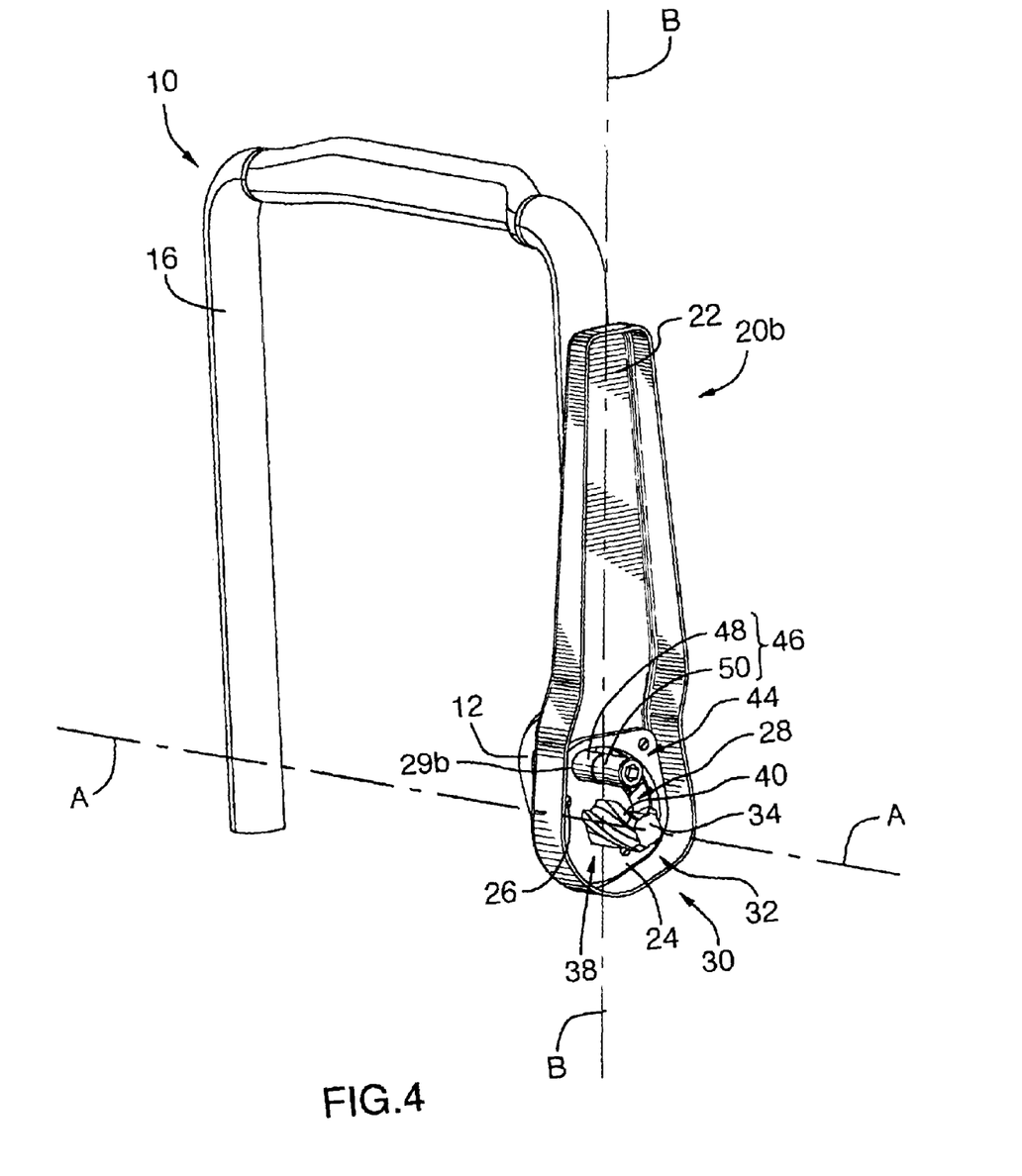
FIG. 4 is a top right perspective view of the armrest adjustment mechanism of FIG. 3.
Figure 5:
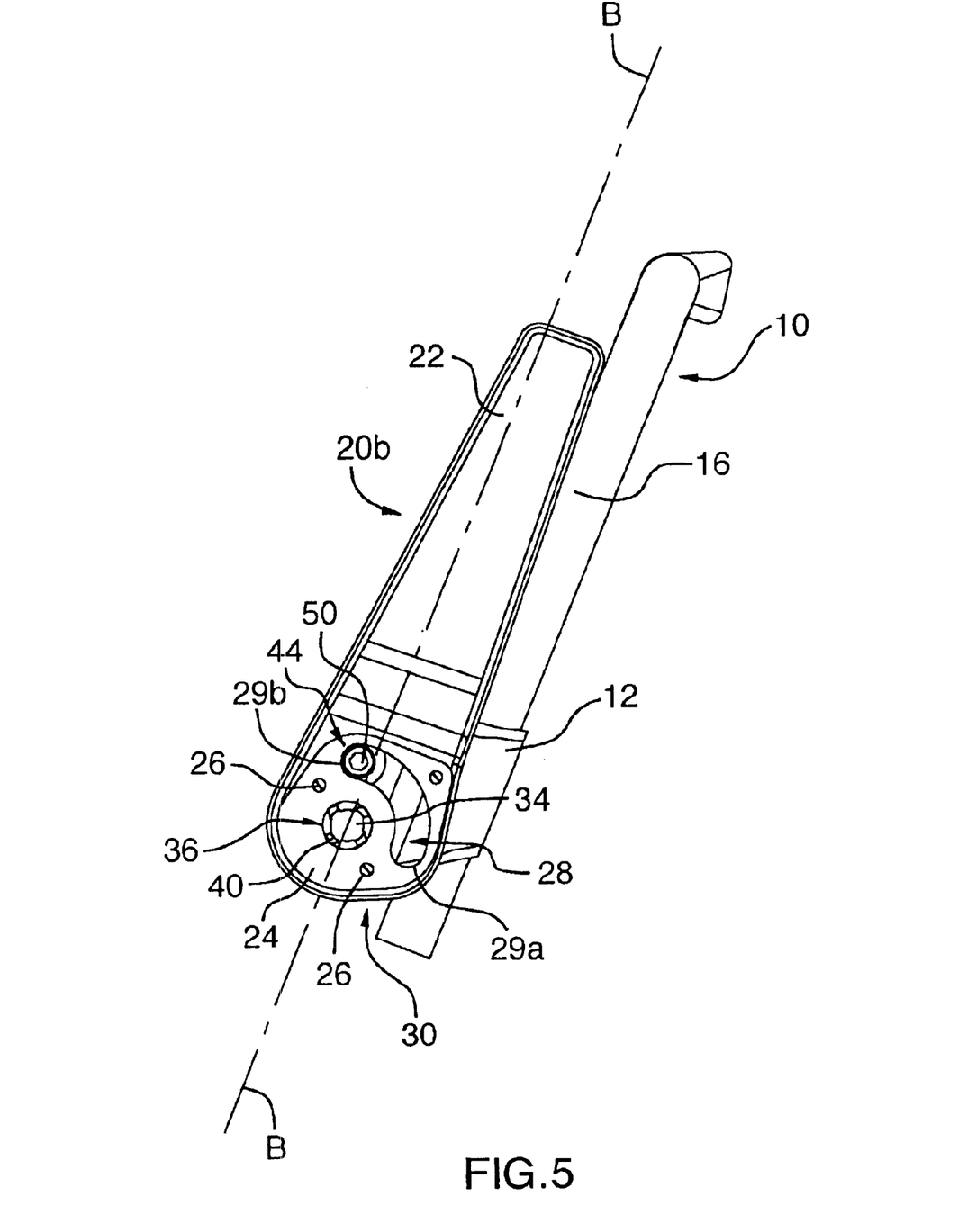
FIG. 5 is a right side elevational view of the armrest adjustment mechanism of FIG. 3.

With specific reference now to FIGS. 2 through 5 of the drawings, the mechanism 30 will be seen to include a mounting means 32 for pivotally mounting the armrest member 20b on the vehicle seat 10 for selective pivotal rotation about the lateral seat axis "A" between the deployed design configuration (as best seen in FIG. 2), wherein the longitudinal axis "B" has the substantially horizontal orientation as aforesaid, and the raised stowed configuration (as best seen in FIGS. 3 through 5), wherein the longitudinal axis "B" has the substantially vertical orientation as aforesaid. It will, however, be appreciated that the longitudinal axis "B" of the armrest member 20b may have a more or less substantially horizontal orientation in the deployed design configuration, and a more or less substantially vertical orientation in the raised stowed configuration, than those orientations that are specifically shown in the drawings.

Figure 6:
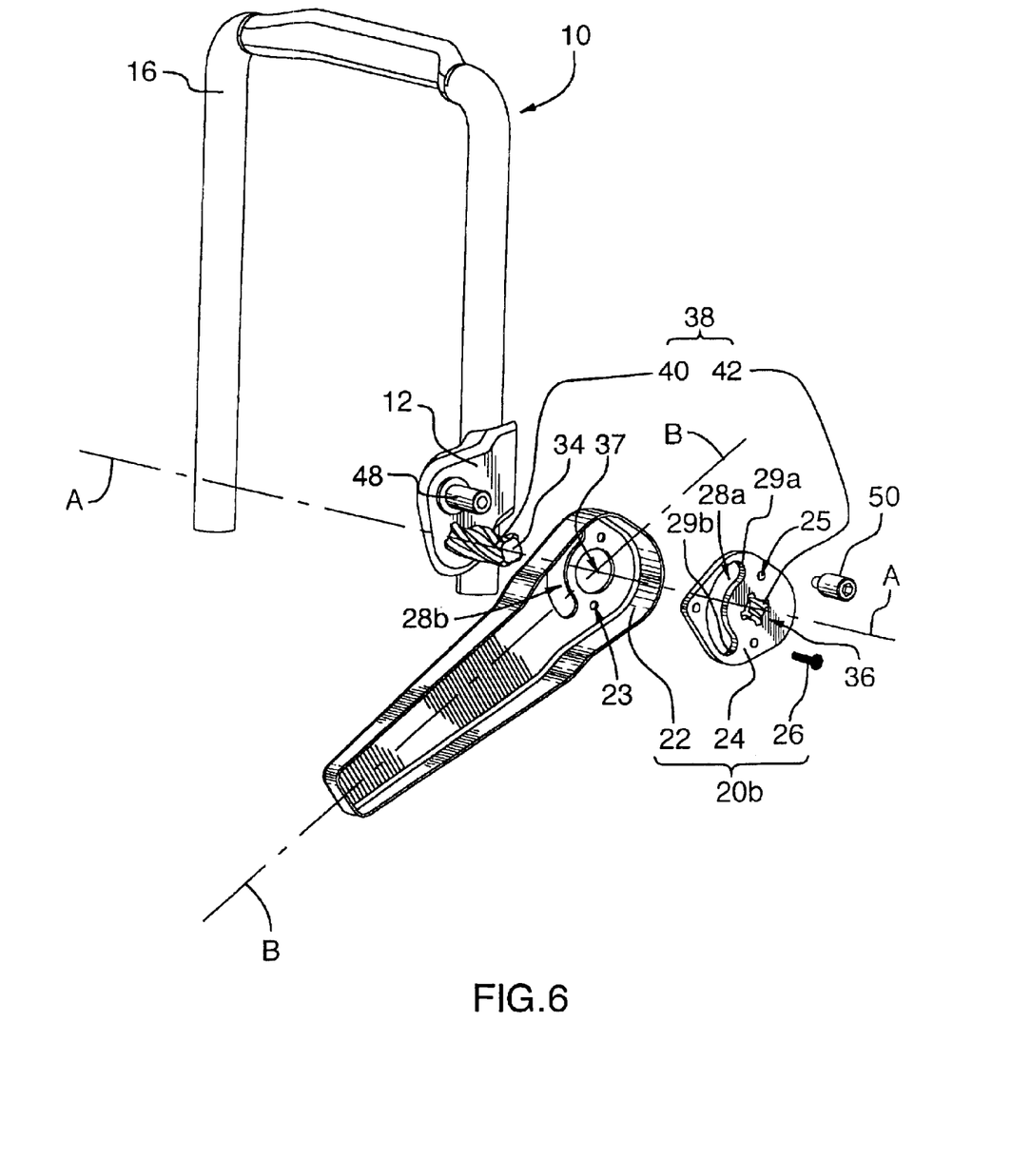
FIG. 6 is an exploded top right perspective view of the armrest adjustment mechanism of FIG. 2.
Figure 6A:
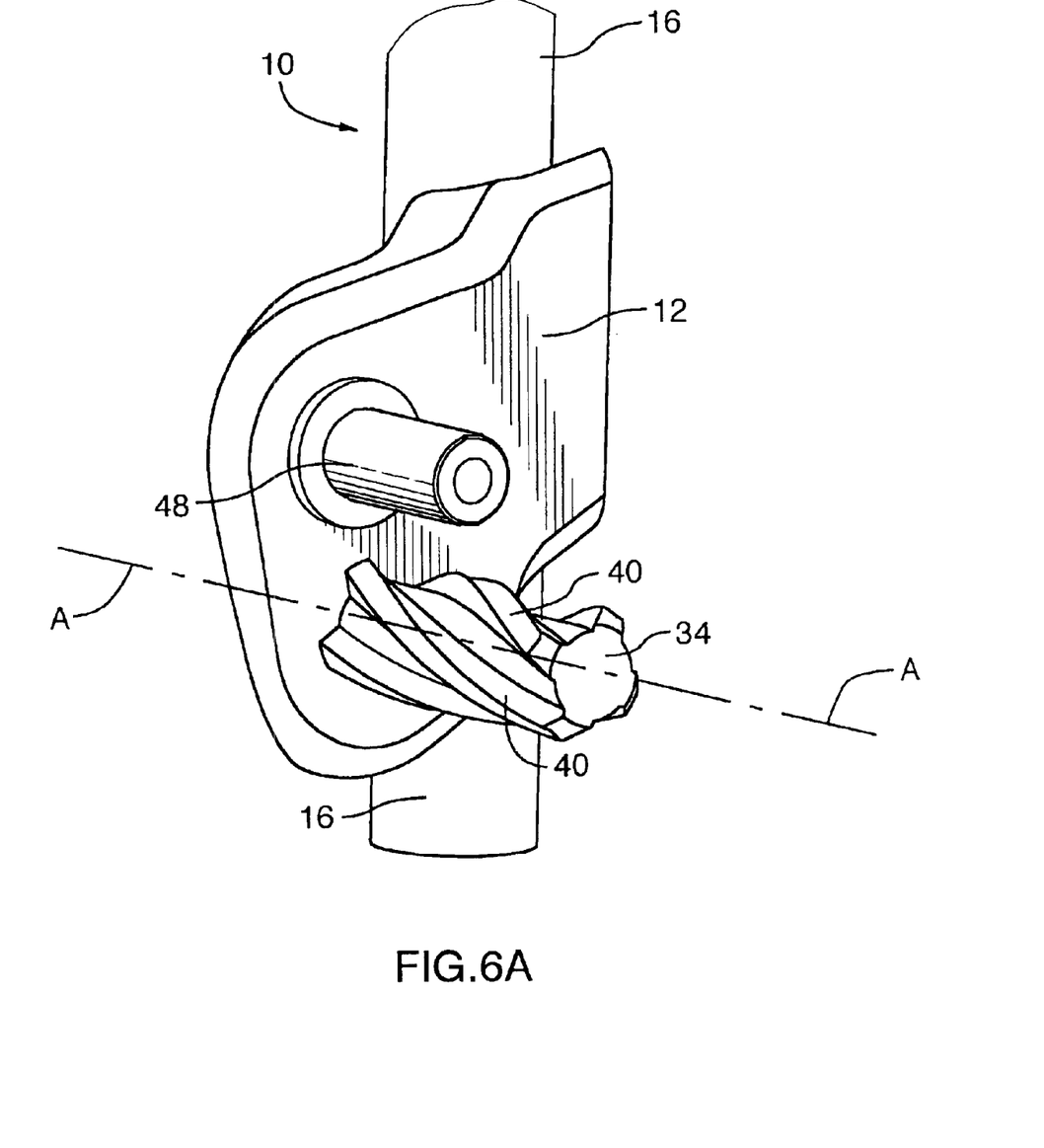
FIG. 6A is an enlarged top right partial perspective view of a first portion of the mechanism of FIG. 6.
Figure 6B:
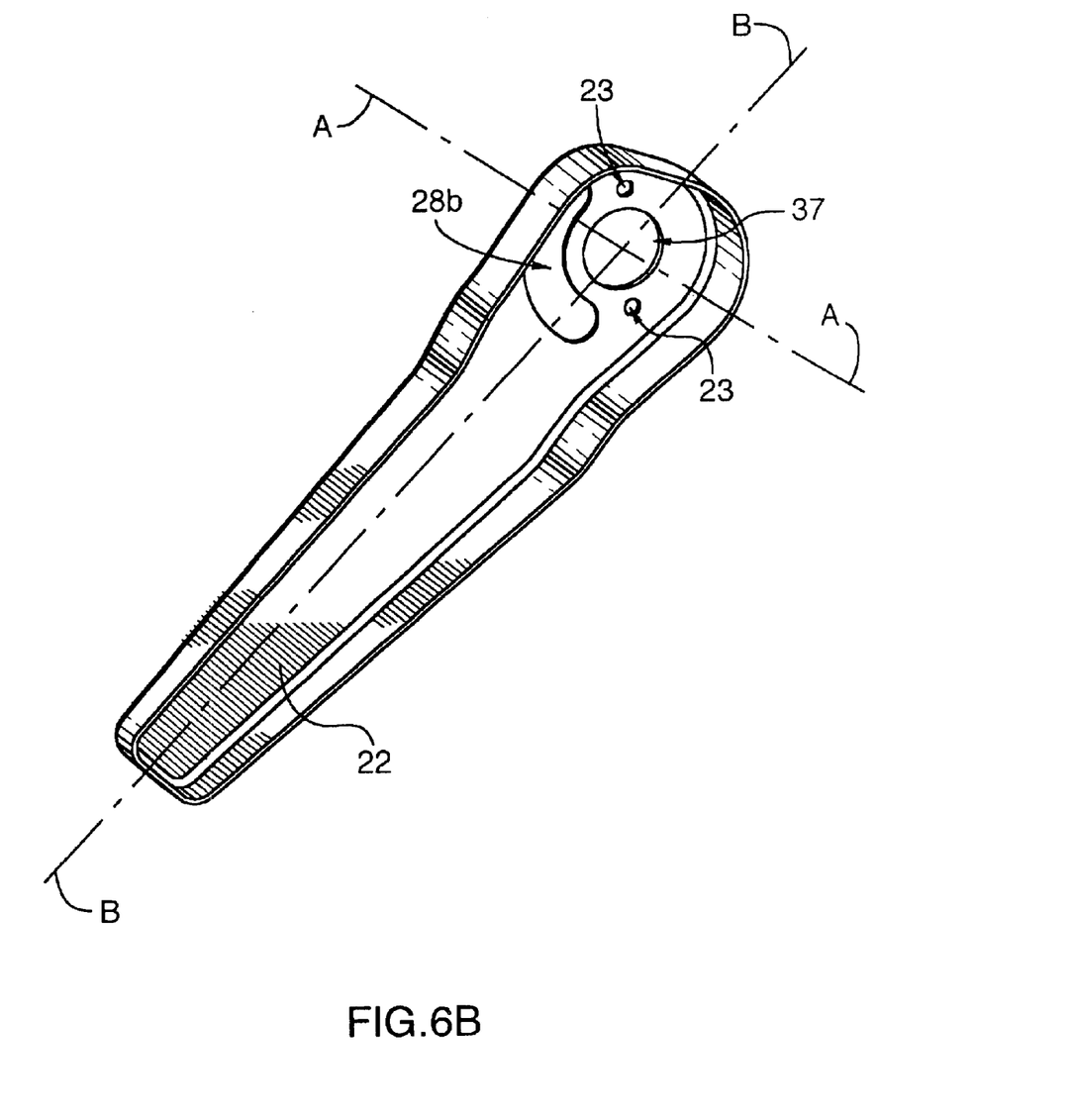
FIG. 6B is an enlarged top right partial perspective view of a second portion of the mechanism of FIG. 6.

The mounting means 32 includes a male pivot pin 34 that defines a pivot axis that is preferably in substantially coaxial relation with the lateral seat axis "A". As best seen in FIG. 6A, the pivot pin 34 is rigidly mounted on the pivot support plate 12. The male pivot pin 34 (best seen in FIG. 6A) pivotally engages a complementary female pivot bearing 36 (best seen in FIG. 6C) of the mounting means 32 for pivotal rotation of the pivot bearing 36 about the pivot pin 34. The pivot bearing 36 is rigidly mounted on an armrest mounting plate 24 (best seen in FIG. 6C). The armrest mounting plate 24 has a number of bracket fastening apertures 25 formed therethrough. An armrest bracket 22 of the armrest member 20b (best seen in FIG. 6B) has a corresponding number of threaded plate fastening apertures 23 and a pin aperture 37 formed therethrough. Fasteners 26 are used to rigidly mount the armrest mounting plate 24 to the armrest bracket 22, and in this respect, each one of the fasteners 26 securely engages in through-passing relation a single bracket fastening aperture 25 and a corresponding single plate fastening aperture 23. As may be best appreciated from FIGS. 6 and 7, with armrest mounting plate 24 mounted to the armrest bracket 22, the pin aperture 37 of the armrest bracket 22 is substantially axially aligned with the pivot bearing 36 along the lateral seat axis "A".

With reference inter alia to FIG. 2, the armrest adjustment mechanism 30 also includes a lateral translation means 38 in the form of a spiral screw-thread 40 (best seen in FIG. 6A) extending axially around the pivot pin 34 so as to threadingly engage a complementary threaded segment 42 (best seen in FIG. 6C) formed on the pivot bearing 36. In use, inward displacement (i.e., in a direction parallel to arrow "C" of FIG. 2) of the armrest member 20b along the lateral seat axis "A" relative to the vehicle seat 10 is not only positive, but is progressively coincident with selective rotation of the armrest member 20b from the deployed design configuration (shown in FIG. 2) towards the raised stowed configuration (shown in FIG. 4). Conversely, outward displacement (i.e., in a direction parallel to arrow "D" of FIG. 1) of the armrest member 20b along the lateral seat axis "A" relative to the vehicle seat 10 is not only positive, but is progressively coincident with selective rotation of the armrest member 20b about the lateral seat axis "A" from the raised stowed configuration towards the deployed design configuration.

As previously noted, the armrest member 20b shown in FIGS. 2 through 8 corresponds with the outboard-side armrest member 20b of FIG. 1. The outboard-side armrest member 20b has directions of inward and outward displacement, "C" and "D" respectively, that are in substantially opposed relation with corresponding directions for the inboard-side armrest member 20a. That is, the inboard-side armrest member 20a is inwardly displaced in a direction parallel to arrow C' of FIG. 1, and outwardly displaced in a direction parallel to arrow D'.

Figure 7:
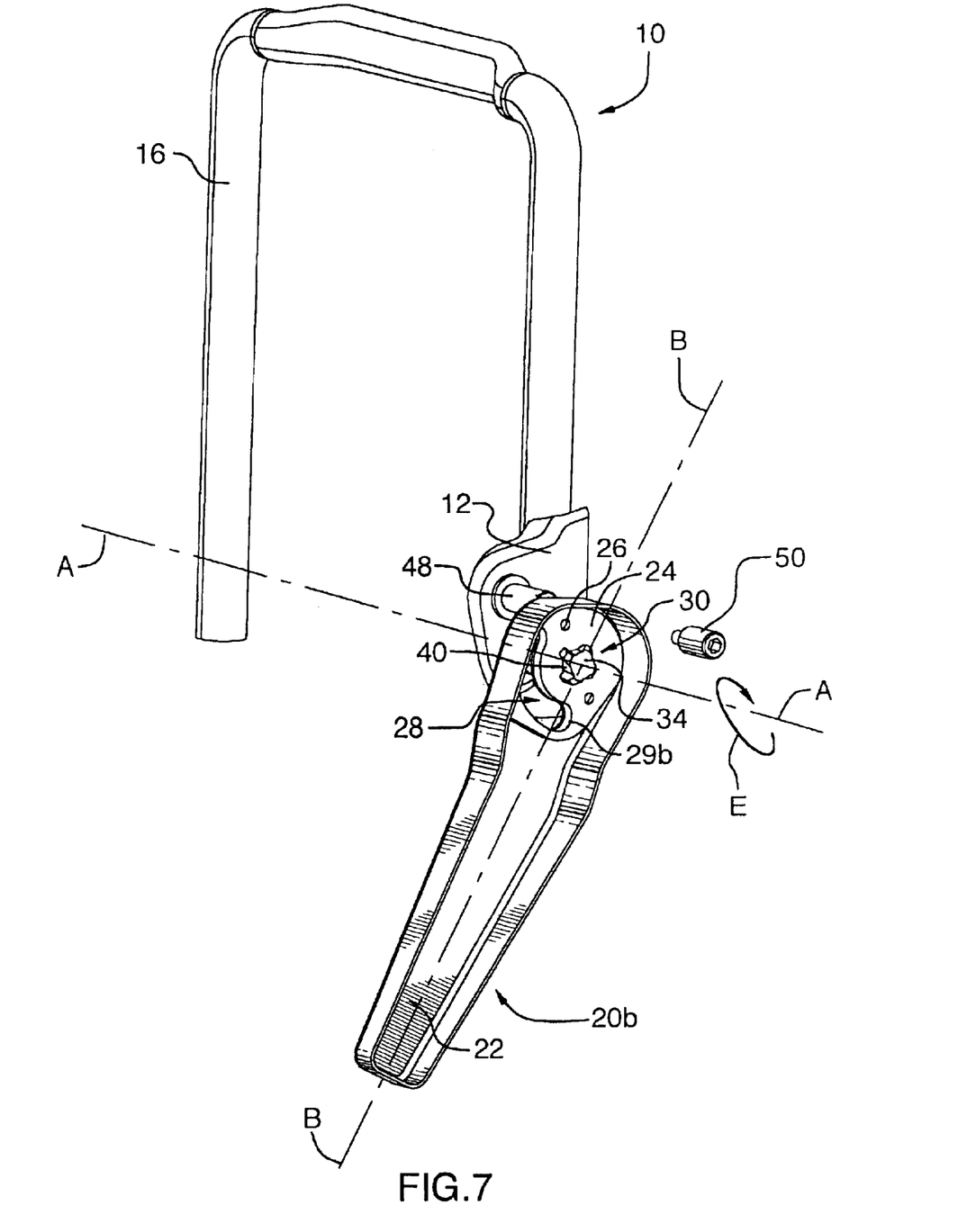
FIG. 7 is a top right perspective view of the armrest adjustment mechanism of FIG. 1, shown in an initial assembly configuration.

The mechanism 30 further includes a stop means 44 for preventing rotation of the armrest member 20b beyond the deployed design configuration (shown in FIG. 2). According to the preferred embodiment of the invention shown in the drawings, the stop means 44 is in the form of a guide pin 46 which comprises a fixed segment 48, that is rigidly mounted on the pivot support plate 12 (as best seen in FIG. 6A), and an extension segment 50, that operatively engages the armrest member 20b in abutting relation in the deployed design configuration. The extension segment 50 securely engages the fixed segment 48 in selectively removable relation, and removal of the extension segment 50 allows selective rotation of the armrest member 20b beyond the deployed design configuration (as best seen in FIG. 7), and as described more fully below. It is to be noted that removal of the extension segment 50 from the fixed segment 48 also allows for the subsequent selective removal of the pivot bearing 36 from the pivot pin 34, with the preferably corresponding removal of the armrest member 20b from the vehicle seat 10.

In the preferred embodiment of the invention shown in the figures, the guide pin 46 is adapted for movement within an arcuate guide slot 28 that is formed in the armrest member 20b. The guide pin 46 moves within the guide slot 28 as the armrest member 20b is selectively rotated between the deployed design configuration and the raised stowed configuration. The arcuate guide slot 28 has a mounting plate portion 28a that is formed in the armrest mounting plate 24 (best seen in FIG. 6C) and a bracket portion 28b that is formed in the armrest bracket 22 (best seen in FIG. 6B). As may be best appreciated from FIGS. 6 and 7, when the armrest mounting plate 24 is mounted to the armrest bracket 22 as aforesaid, the mounting plate portion 28a of the guide slot 28 is aligned with the bracket portion 28b of the guide slot 28 in an arcuate path that extends in partially circumferencing relation about the lateral seat axis "A".

Figure 6C:
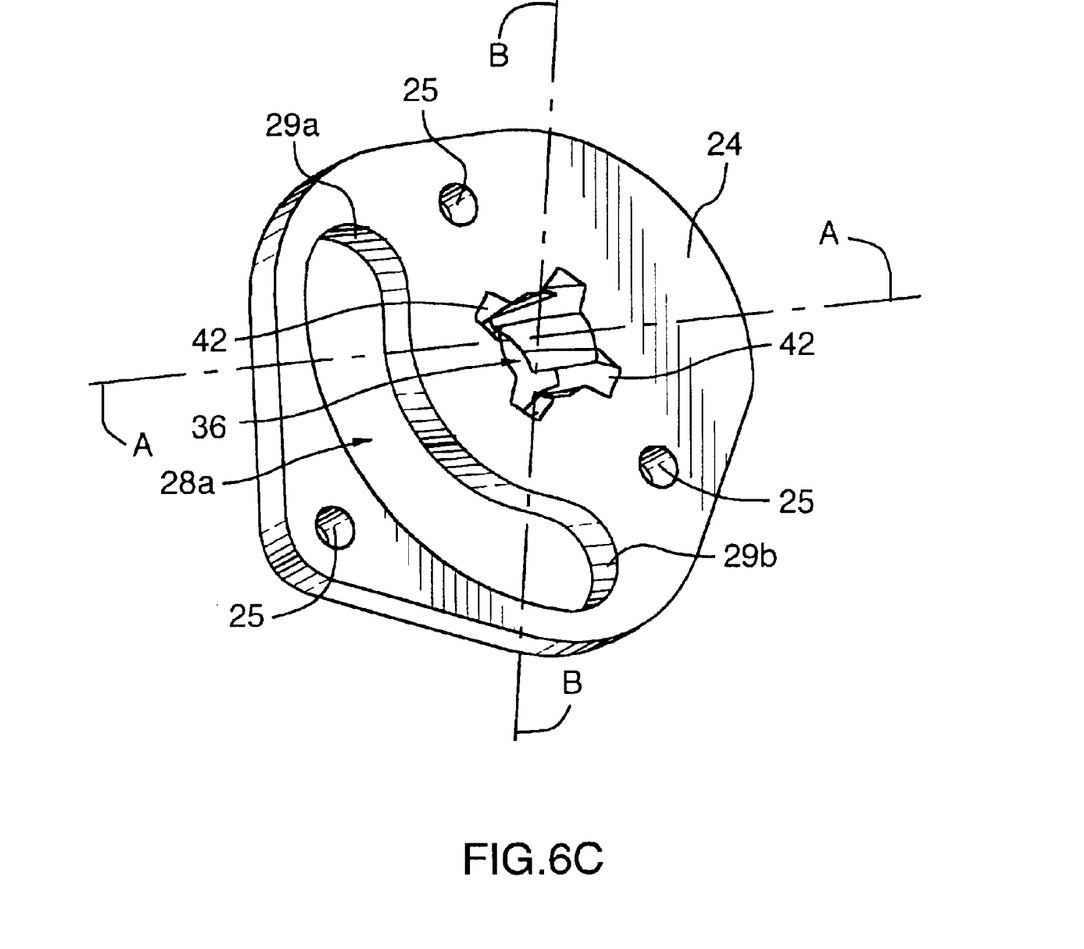
FIG. 6C is an enlarged top right partial perspective view of a third portion of the mechanism of FIG. 6.

With specific reference to FIG. 6C, the mounting plate portion 28a will be seen to have a first blind end 29a and a second blind end 29b. The first blind end 29a operatively engages the extension segment 50 of the guide pin 46 in abutting relation in the deployed design configuration (as best seen in FIG. 2). The second blind end 29b operatively engages the fixed segment 48 of the guide pin 46 in abutting relation in the raised stowed configuration (as best seen in FIGS. 4 and 5).

It may be appreciated from a consideration of FIGS. 7 and 8 that, as discussed in further detail below, when the armrest member 20b is in a detached configuration (not shown), wherein the armrest member 20b is removed from its ordinary mounting on the vehicle seat 10, the removal of the extension segment 50 from the fixed segment 48 will allow the armrest member 20b to be mounted on the vehicle seat 10 for selective rotation about the lateral seat axis "A" beyond the deployed design configuration. Again, as will be discussed in further detail below, the subsequent attachment of the extension segment 50 to the fixed segment 48 will prevent opposite rotation of the armrest member 20b beyond the deployed design configuration, such that the armrest member 20b will thereafter be prevented from accidentally becoming removed from the vehicle seat 10, by way of axial displacement of the armrest member 20b along the spiral screw-thread 40 in the direction of arrow "D".

In use of the armrest adjustment mechanism 30 according to the invention, selective pivotal rotation of the armrest member 20b about the lateral seat axis "A" of the vehicle seat 10, from the deployed design configuration to the raised stowed configuration, is coincident with progressive inward travel of the threaded segment 42 of the pivot bearing 36 along the spiral screw-thread 40 of the pivot pin 34, and with consequential positive, progressive inward displacement (in the direction of arrow "C") of the armrest member 20b. Likewise, selective pivotal rotation of the armrest member 20b, from the raised stowed configuration to the deployed design configuration, is coincident with progressive outward travel of the threaded segment 42 of the pivot bearing 36 along the spiral screw-thread 40 of the pivot pin 34, and with consequential positive, progressive outward displacement (in the direction of arrow "D") of the armrest member 20b.

To assemble the armrest adjustment mechanism 30 according to the method of the invention, a number of preparatory steps are performed, either in the sequence as follows, in an alternate operative sequence, or in a parallel course with one another: (I) the male pivot pin 34 with its spiral screw thread 40 is rigidly attached, by welding or the like, to the pivot support plate 12 of the vehicle seat 10; (II) the complementary female pivot bearing 36 with its complementary threaded segment 42 is formed on the armrest mounting plate 24; (III) the pin aperture 37 of the pivot bearing 36 is formed on the armrest bracket 22 of the armrest member 20b; (IV) the fixed segment 48 of the stop means 44 is rigidly attached, by welding or the like, to the pivot support plate 12; (V) the mounting plate portion 28a of the arcuate guide slot 28 is formed in the armrest mounting plate 24; and (VI) the bracket portion 28b of the arcuate guide slot 28 is formed in the armrest bracket 22 of the armrest member 20b.

Figure 8:
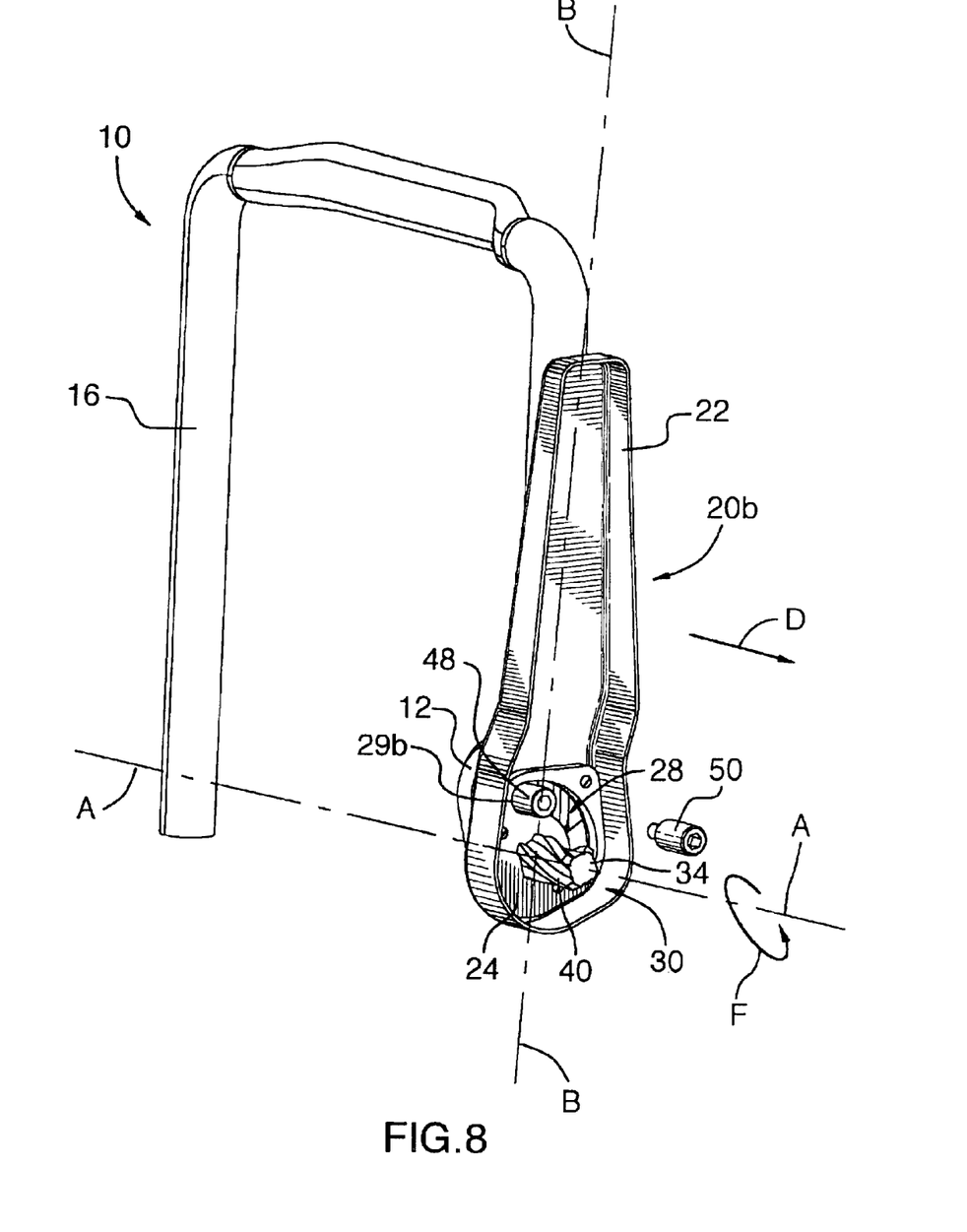
FIG. 8 is a top right perspective view of the armrest adjustment mechanism of FIG. 3, shown in a partially exploded configuration.

It should be once again noted that the fixed segment 48, rigidly attached to the pivot support plate as aforesaid, is adapted to permit rotation of the armrest member 20b in a first inward pivoting direction (substantially parallel to arrow "E" of FIG. 7) from an initial assembly configuration (best seen in FIG. 7), wherein the spiral screw thread 40 is initially aligned with the complementary threaded segment 42, beyond the deployed design configuration (best seen in FIG. 2), towards the raised stowed configuration (best seen in FIG. 8).

It should perhaps also be noted once again that the arcuate guide slot 28 is adapted to receive the extension segment 50 of the stop means 44 in the deployed design configuration, and to receive the fixed segment 48 in the raised stowed configuration.

With the aforesaid preparatory steps completed, the armrest mounting plate 24 is rigidly attached to the armrest bracket 22 as previously described. Thereafter, the complementary threaded segment 42 of the pivot bearing 36 is wound on to the spiral screw-thread 40 of the pivot pin 34, in the first inward pivoting direction about the lateral seat axis "A", from the initial assembly configuration of the armrest member 20b (best seen in FIG. 7). Next, the armrest member 20b is pivotally rotated in the first inward pivoting direction, beyond the deployed design configuration, to the raised stowed configuration (best seen in FIG. 8). The extension segment 50 of the stop means 44 is then rigidly mounted, by threading or the like, on the fixed segment 48. In this manner, the armrest adjustment mechanism 30 may be easily and securely attached to both the armrest member 20b and the vehicle seat 10.

It will be appreciated that, with the extension segment 50 mounted as aforesaid on the fixed segment 48, the armrest member 20b is prevented from opposite rotation, in a second outward pivoting direction (substantially parallel to arrow "F" in FIG. 8), back beyond the deployed design configuration. That is, when the extension segment 50 is rigidly attached to the fixed segment 48 which is, in turn, rigidly attached to the vehicle seat 10, the extension segment 50 operatively engages in abutting relation the armrest member 20b in the deployed design configuration.

Other modifications and alterations may be used in the design and manufacture of the armrest adjustment mechanism 30 according to the present invention without departing from the spirit and scope of the invention, which is limited only by the accompanying claims. For example, the vehicle seat 10 may be provided with only one or the other of the inboard-side armrest member 20a and the outboard-side armrest member 20b mounted thereon. As stated previously, the armrest member 20b might be mounted on the seat cushion portion 18 of the vehicle seat 10 instead of on the backrest portion 14. As well, instead of providing the guide slot 28 with a second blind end 29b that abuttingly engages the guide pin 46 in the raised stowed configuration, the armrest recess 17 of the backrest portion 14 might be adapted to limit the motion of the armrest member 20b therebeyond. As well, the vehicle seat 10 might be provided without a pivot support plate 12, and instead, the pivot pin 34 and the fixed segment 48 might be rigidly mounted directly on the back frame 16 or to some other part of the vehicle seat 10. Further, and instead of mounting the pivot pin 34 on the pivot support plate 12 of the vehicle seat 10 and the pivot bearing 36 on the armrest member 20b, their positions might be reversed, with the pivot pin 34 being mounted on the armrest member 20b and the pivot bearing 36 mounted on the pivot support plate 12 of the vehicle seat 10. Also, instead of providing a separate armrest mounting plate 24 and armrest bracket 22, the armrest member 20b might have a single unitary construction. As well, the armrest mounting plate 24 might be attached to the separate armrest bracket 22 by alternate means than the fasteners 26 shown in the drawings, such as, for example, by welding and/or by adhesives.

Additionally, the lateral translation means 38 may be other than in the form of the spiral screw-thread 40 and the complementary threaded segment 42. Instead, the armrest member 20b could be biased to one or the other of the deployed design configuration and the raised stowed configuration, with the pivot pin 34 and pivot bearing 36 incorporating a bayonet-type mount with a circumferencing guide slot and pin arrangement together with a release slot having a path with an axial component substantially parallel with said lateral seat axis. With such an arrangement, and in a number of others which would fall within the scope of the claimed invention, the lateral displacement of the armrest member 20b might not be progressively coincident with its rotation about the lateral seat axis "A", but could instead be stepped or might occur in a series of one or more distinct increments. In any case, the lateral displacement is positive in both opposed directions, as it is not in any way arbitrary or vague.

In yet another contemplated variant that falls within the scope of the invention, the stop means 44 might not take the form of a guide pin 46, and might instead take any number of other forms that limit the rotation of the armrest member 20b beyond the deployed design configuration, such as, for example, those forms incorporating a simple spring-biased arrangement and those in which the stop means 44 is actually incorporated into the mounting means 32 or the lateral translation means 40, whether by pressure-fit or otherwise. In such an embodiment, the pivot bearing 36 might only rotate in a limited arc about the pivot pin 34, or the threaded segment 42 might only be capable of being threaded in a limited arc about the screw-thread 40. Further, in another modification, the fixed segment 48 of the guide pin 46 might be rigidly attached to the armrest member 20b instead of to the vehicle seat 10. In another modification, the extension segment 50 of the guide pin 46 might be adapted to operatively engage the armrest member 20b in abutting relation in the raised stowed configuration, instead of in the deployed design configuration, such that removal of the extension segment 50 from the fixed segment 48 would allow selective rotation of the armrest member 20b beyond the raised stowed configuration so as to thereby remove same from the vehicle seat 10. As well, the armrest adjustment mechanism 30 of the current design might be assembled by other methods, and/or with the steps of the specified method of assembly in an alternate order. Given the great number of example modifications discussed above, it should perhaps be noted once again that other modifications and alterations may be used in the design and manufacture of the armrest adjustment mechanism 30 according to the present invention without departing from the spirit and scope of the invention, which is of course limited only by the accompanying claims.

We claim:

1. An armrest adjustment mechanism for use with a vehicle seat defining a lateral seat axis and an armrest member defining a longitudinal axis, said mechanism comprising:
    (a) a mounting means for pivotally mounting said armrest member on said vehicle seat for selective pivotal rotation about said lateral seat axis between a deployed design configuration, wherein said longitudinal axis has a substantially horizontal orientation, and a raised stowed configuration, wherein said longitudinal axis has a substantially vertical orientation; wherein said mounting means comprises a male pivot pin pivotally engaging a complementary female pivot pin bearing for pivotal rotation of said pivot bearing about a pivot axis defined by said pivot pin, said pivot pin being rigidly mounted on said vehicle seat, with said pivot axis in substantially coaxial relation to said lateral seat axis, and with said pivot bearing being rigidly mounted on said armrest member; and
    (b) a lateral translation means for positive inward displacement of said armrest member along said lateral seat axis relative to said vehicle seat as said armrest member is selectively rotated as aforesaid from said deployed design configuration towards said raised stowed configuration; wherein said lateral translation means comprises a spiral screw thread extending axially around said pivot pin so as to threadingly engage a complementary threaded segment formed on said pivot bearing.

2. An armrest adjustment mechanism according to claim 1, wherein said inward displacement of said armrest member is progressively coincident with selective rotation of said armrest member about said lateral seat axis from said deployed design configuration towards said raised stowed configuration as aforesaid.

3. An armrest adjustment mechanism according to claim 2, further comprising a stop means for preventing rotation of said armrest member beyond said deployed design configuration, said stop means being rigidly attached to said vehicle seat, and with said stop means operatively engaging said armrest member in said deployed design configuration.

4. An armrest adjustment mechanism according to claim 3, wherein said stop means comprises a guide pin rigidly attached to said vehicle seat and adapted to operatively engage in abutting relation said armrest member in said deployed design configuration.

5. An armrest adjustment mechanism for use with a vehicle seat defining a lateral seat axis and an armrest member defining a longitudinal axis, said mechanism comprising:
    (a) a mounting means for pivotally mounting said armrest member on said vehicle seat for selective pivotal rotation about said lateral seat axis between a deployed design configuration, wherein said longitudinal axis has a substantially horizontal orientation, and a raised stowed configuration, wherein said longitudinal axis has a substantially vertical orientation;
    (b) a lateral translation means for positive inward displacement of said armrest member along said lateral seat axis relative to said vehicle seat as said armrest member is selectively rotated as aforesaid from said deployed design configuration towards said raised stowed configuration; and
    (c) a stop means for preventing rotation of said armrest member beyond said deployed design configuration, said stop means being rigidly attached to said vehicle seat, and with said stop means operatively engaging said armrest member in said deployed design configuration; wherein said stop means comprises a guide pin rigidly attached to said vehicle seat and adapted to operatively engage in abutting relation said armrest member in said deployed design configuration; with said guide pin comprising a fixed segment rigidly attached to said vehicle seat, and an extension segment operatively engaging in abutting relation said armrest member in said deployed design configuration, said extension segment securely engaging said fixed segment in selectively removable relation, wherein removal of said extension segment from said fixed segment allows selective rotation of said armrest member beyond said deployed design configuration.

6. An armrest adjustment mechanism according to claim 5, wherein removal of said extension segment from said fixed segment allows subsequent selective removal of said pivot bearing with said armrest member from said pivot pin.

7. An armrest adjustment mechanism according to claim 6, wherein said pivot bearing is rigidly mounted on an armrest mounting plate that is rigidly mounted on said armrest member.

8. An armrest adjustment mechanism according to claim 7, wherein said pivot pin and said fixed segment are each respectively rigidly mounted on a pivot support plate that is rigidly mounted on said vehicle seat.

9. An armrest adjustment mechanism according to claim 5, wherein said guide pin is adapted for movement within an arcuate guide slot formed in said armrest member as said armrest member is selectively rotated as aforesaid from said deployed design configuration towards said raised stowed configuration.

10. An armrest adjustment mechanism according to claim 9, wherein said arcuate guide slot has a first blind end and a second blind end, and wherein said extension segment of said guide pin operatively engages in abutting relation said first blind end in said deployed design configuration.

11. An armrest adjustment mechanism according to claim 10, wherein said guide pin operatively engages in abutting relation said second blind end in said raised stowed configuration.

12. An armrest adjustment mechanism according to claim 11, wherein said fixed segment of said guide pin operatively engages in abutting relation said second blind end in said raised stowed configuration.

13. An armrest adjustment mechanism according to claim 12, wherein said mounting means comprises a male pivot pin pivotally engaging a complementary female pivot bearing for pivotal rotation of said pivot bearing about a pivot axis defined by said pivot pin, said pivot pin being rigidly mounted on said vehicle seat, with said pivot axis in substantially coaxial relation to said lateral seat axis; with said pivot bearing being rigidly mounted on said armrest member, and with said pivot bearing being rigidly mounted on an armrest mounting plate that is rigidly mounted on said armrest member.

14. An armrest adjustment mechanism according to claim 13, wherein said arcuate guide slot is further formed in said armrest mounting plate.

15. An armrest adjustment mechanism according to claim 14, wherein said pivot pin and said fixed segment are each respectively rigidly mounted on a pivot support plate that is rigidly mounted on said vehicle seat.

16. A method of assembling an armrest adjustment mechanism for use with a vehicle seat defining a lateral seat axis and an armrest member defining a longitudinal axis, said method comprising the steps of:
  (a) rigidly mounting a male pivot pin on said vehicle seat in substantially coaxial relation with said lateral seat axis and having a spiral screw thread extending axially therearound;
  (b) rigidly mounting a complementary female pivot bearing on said armrest member, said pivot bearing having a complementary threaded segment formed thereon;
  (c) winding said complementary threaded segment of said pivot bearing on to said spiral screw thread of said pivot pin, in a first inward pivoting direction about said lateral seat axis, from an initial assembly configuration of said armrest member, wherein said spiral screw thread is initially aligned with said complementary threaded segment;
  (d) pivotally rotating said armrest member relative to said vehicle seat in said first inward pivoting direction beyond a deployed design configuration, wherein said longitudinal axis has a substantially horizontal orientation; and
  (e) rigidly mounting a stop means on said vehicle seat for preventing opposite rotation of said armrest member in a second outward pivoting direction beyond said deployed design configuration, with said stop means operatively engaging said armrest member in said deployed design configuration;
such that said armrest member is selectively pivotally rotatable on said vehicle seat about said lateral seat axis between said deployed design configuration, wherein as aforesaid said longitudinal axis has said substantially horizontal orientation, and a raised stowed configuration, wherein said longitudinal axis has a substantially vertical orientation.

17. A method of assembling an armrest adjustment mechanism according to claim 16, wherein said stop means in step (e) comprises a fixed segment and an extension segment, and wherein, before step (c), said method further comprises an additional step of:
  (b.1) rigidly mounting said fixed segment on said vehicle seat, with said fixed segment adapted to permit rotation of said armrest member from said initial assembly configuration in said first inward pivoting direction beyond said deployed design configuration towards said raised stowed configuration;
and wherein, in step (e), said extension segment is rigidly mounted on said fixed segment, with said extension segment operatively engaging in abutting relation said armrest member in said deployed design configuration.

18. A method of assembling an armrest adjustment mechanism according to claim 17, wherein, in step (e), said extension segment is rigidly mounted on said fixed segment in selectively removable relation.

19. A method of assembling an armrest adjustment mechanism according to claim 18, further comprising before step (c) a still additional step of:
  (b.2) forming an arcuate guide slot in said armrest member, with said arcuate guide slot adapted to receive said extension segment in said deployed design configuration, and to receive said fixed segment in said raised stowed configuration.

20. A method of assembling an armrest adjustment mechanism according to claim 19, wherein in step (b.2) said arcuate guide slot has a first blind end that operatively engages said extension segment in abutting relation in said deployed design configuration.

21. A method of assembling an armrest adjustment mechanism according to claim 20, wherein in step (b.2) said arcuate guide slot has a second blind end that operatively engages said fixed segment in abutting relation in said raised stowed configuration.

* * * * *